Feb. 26, 1924.  
W. A. MYERS  
PRUNER'S COAT  
Filed March 20, 1920

1,484,959

INVENTOR
WILLIAM A. MYERS
BY
Martell & Co.
ATTORNEYS

Patented Feb. 26, 1924.

1,484,959

UNITED STATES PATENT OFFICE.

WILLIAM A. MYERS, OF RIVERSIDE, CALIFORNIA.

PRUNER'S COAT.

Application filed March 20, 1920. Serial No. 367,550.

*To all whom it may concern:*

Be it known that I, WILLIAM A. MYERS, a citizen of the United States, and resident of the city of Riverside, in the county of Riverside, State of California, have invented certain new and useful Improvements in Pruners' Coats, of which the following is a specification.

My invention relates primarily to a coat to be worn by persons engaged in trimming or pruning trees and the like and the object thereof is to provide a coat for this purpose provided with a pocket specifically designed for holding a pruning clipper, the pocket being so constructed that the clipper can be easily and quickly placed therein or removed therefrom, and when positioned within said pocket the same will be securely held positioned, whereby danger of accidental displacement is obviated.

A further object is to provide means for protecting the person of the user from injury by said tool while being carried in said pocket, means being provided for covering the shear ends of the tool.

Further objects and advantages will be apparent from the following description, reference being had to the accompanying drawings, in which.

Figure 1:
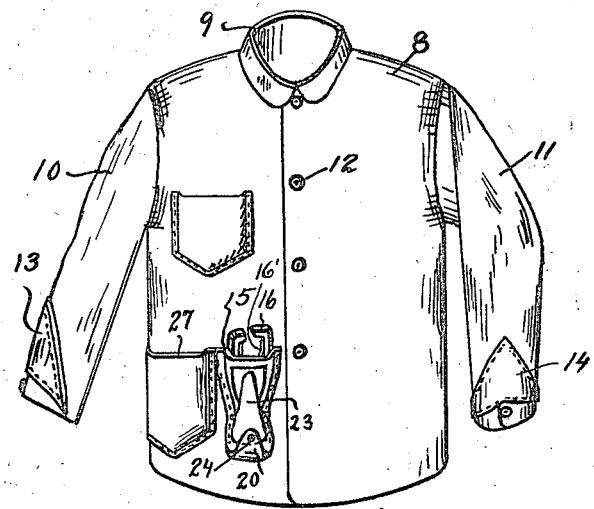
Fig. 1 is a front elevation of a pruner's coat provided with my improved tool carrying pocket, showing a tool in place therein.
Figure 2:
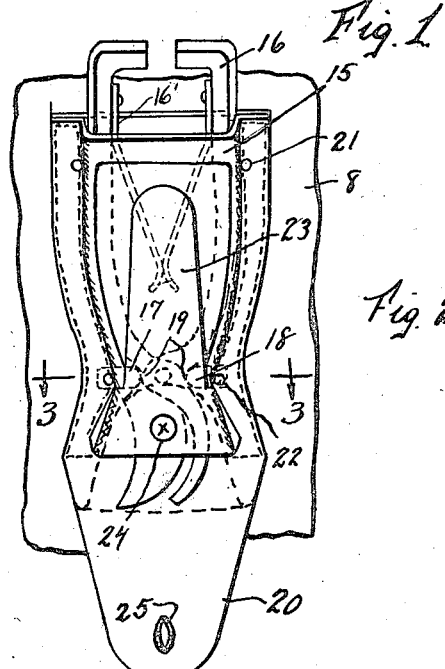
Fig. 2 is an enlarged detail perspective view of my pocket construction.
Figure 3:
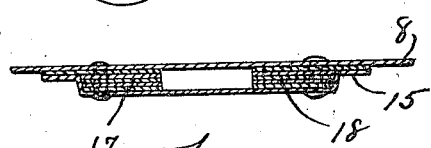
Fig. 3 is a transverse section of the tool pocket taken on the line 3—3 of Fig. 2 looking in the direction indicated by the arrows.

Referring to the drawings my coat comprises a body member 8 provided with the usual collar 9 and sleeves 10 and 11 and opening down the front, buttons 12 being provided for closing said front opening when the coat is being worn. The outer ends of sleeves 10 and 11 are provided with substantially triangular shaped reenforcing patches 13 and 14 secured thereto by stitching or otherwise. Secured to the front of body member 8 at one side of the opening is a clipper holding pocket 15 adapted to securely hold the pruning shears or clippers 16 positioned therein, the clippers being of usual form and provided with leaf springs 16' that normally maintain the clipping jaws in an open position. Pocket 15 is of a configuration to fit the shears when partly open as best shown in Fig. 2, and is provided with inwardly extending opposed retaining members 17 and 18 near its lower end which are adapted to fit within the curved portion 19 of the shears at the sides of the pivot and retain said shears against accidental displacement. The space between the opposed ends of members 17 and 18 is just large enough to permit the end of the shears to pass through when fully closed and when the shears are permitted to partly open by reason of the springs 16' to fit the pocket proper the cutter or head end of the shears opens also thereby preventing the withdrawal thereof until the shears are again fully closed. The lower end of pocket 15 is open and is closed by a flap 20 this construction being for the purpose of cleaning out the pocket when necessary or desirable, twigs, leaves and other trash being sometimes carried therein by the shears or otherwise. It will be understood that the pocket 15 and its associated parts will be made of the same material as the coat and will be secured thereto by stitching, rivets 21 near the upper end of the pocket, and rivets 22 passing through retaining members 17 and 18 being provided for additional strength. The outerside of pocket 15 is provided with a reenforcing member 23 of the same material and secured thereto by stitching. Flap 20 is held closed by a button 24 and button hole 25, or in any other suitable manner.

A pocket 27 is secured to body member 8 at the side of pocket 15 which may be used for any desired purpose.

In the use of my coat when it is desired to remove the shears the user will move the handles thereto together until entirely closed when the shears may be withdrawn. To position the shears within the pocket the handles will be closed and the shears inserted in their proper position and the handles released.

Having described my invention what I claim is:

1. A pocket construction for a clipping tool, a coat body, a fabric strip secured at its side edges to a face of said coat body and spaced therefrom, the width of said pocket being restricted adjacent its lower end, and a tool retaining means secured inside of said pocket at its restricted portion.

2. A tool pocket construction for coats, comprising a coat body, an open ended tool pocket secured to a surface of said coat body, the width of said pocket being restricted adjacent its lower end, and a flap for closing the lower open end of said pocket.

3. A pocket construction for a clipping tool, a coat body, a fabric strip secured at its side edges to a face of said coat body and spaced therefrom, the width of said pocket being restricted adjacent its lower end, a tool retaining means secured inside of said pocket adjacent its restricted portion, the upper and lower ends of said pocket being open, and a fabric flap for closing the lower end of said pocket.

4. A pocket construction for a clipping tool, a coat body, a fabric strip secured at its side edges to a face of said coat body and spaced therefrom, the upper and lower ends of said strip being unsecured, the width of said pocket being restricted adjacent its lower end, and a retaining member secured in the inside of said pocket on either side thereof at its restricted portion.

In witness that I claim the foregoing I have hereunto subscribed my name this 3rd day of March, 1920.

WILLIAM A. MYERS.